May 3, 1932.  H. C. FORD ET AL  1,856,093
AIRPLANE
Filed March 17, 1931   3 Sheets-Sheet 1
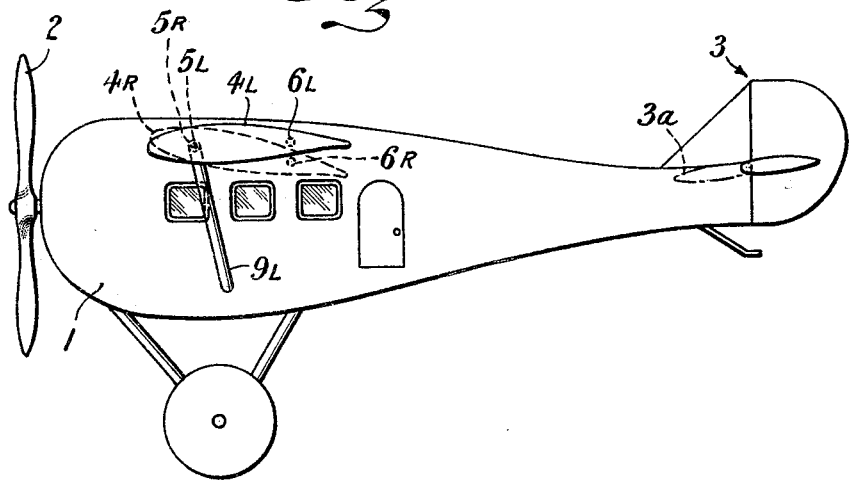
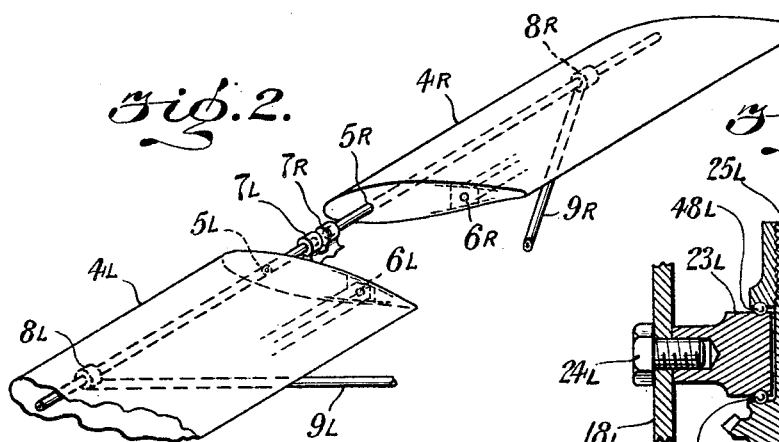
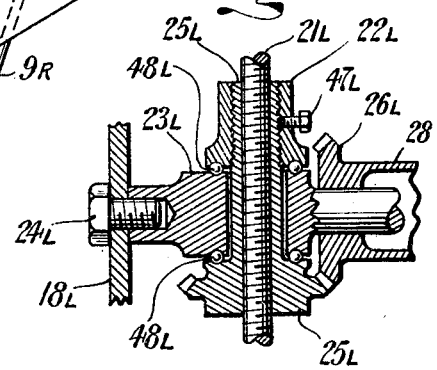
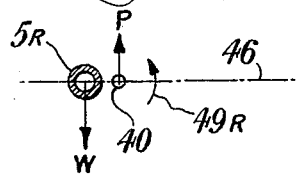
INVENTORS
Hannibal C. Ford,
John McK. Ballou and
Vernon W. Balzer
BY
ATTORNEYS

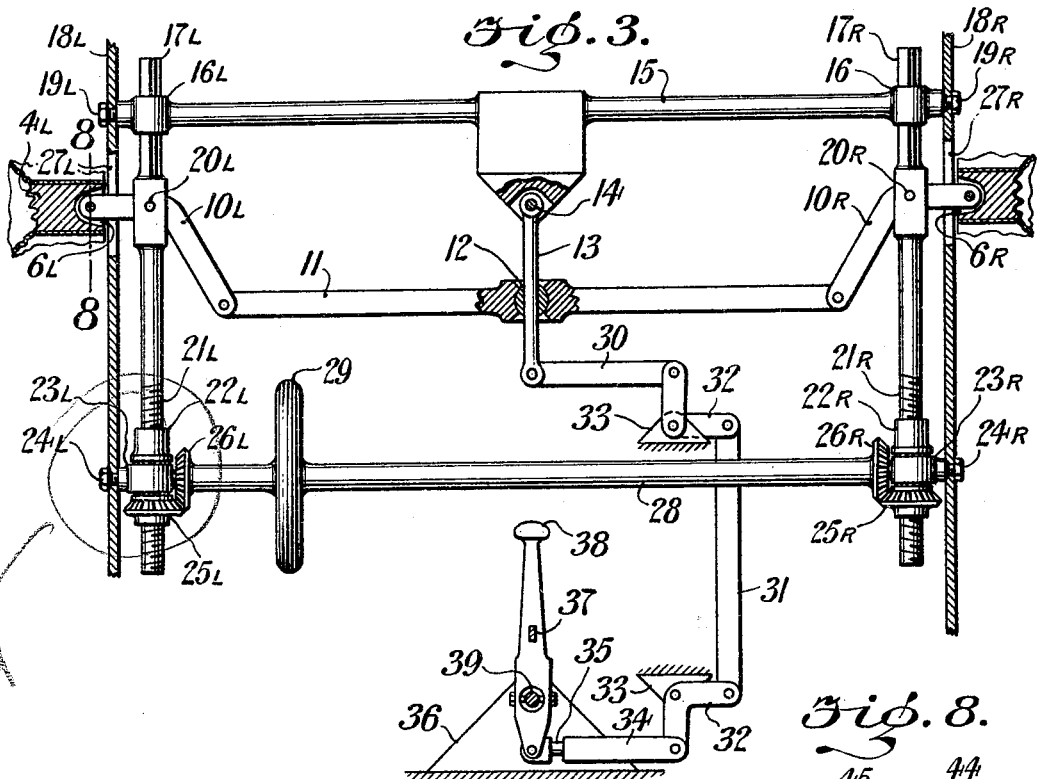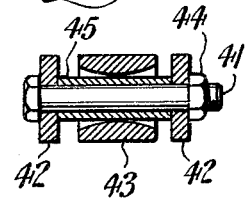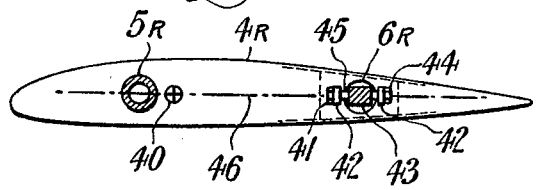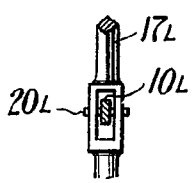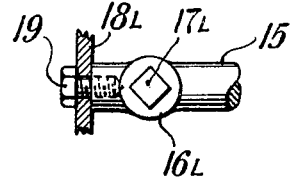

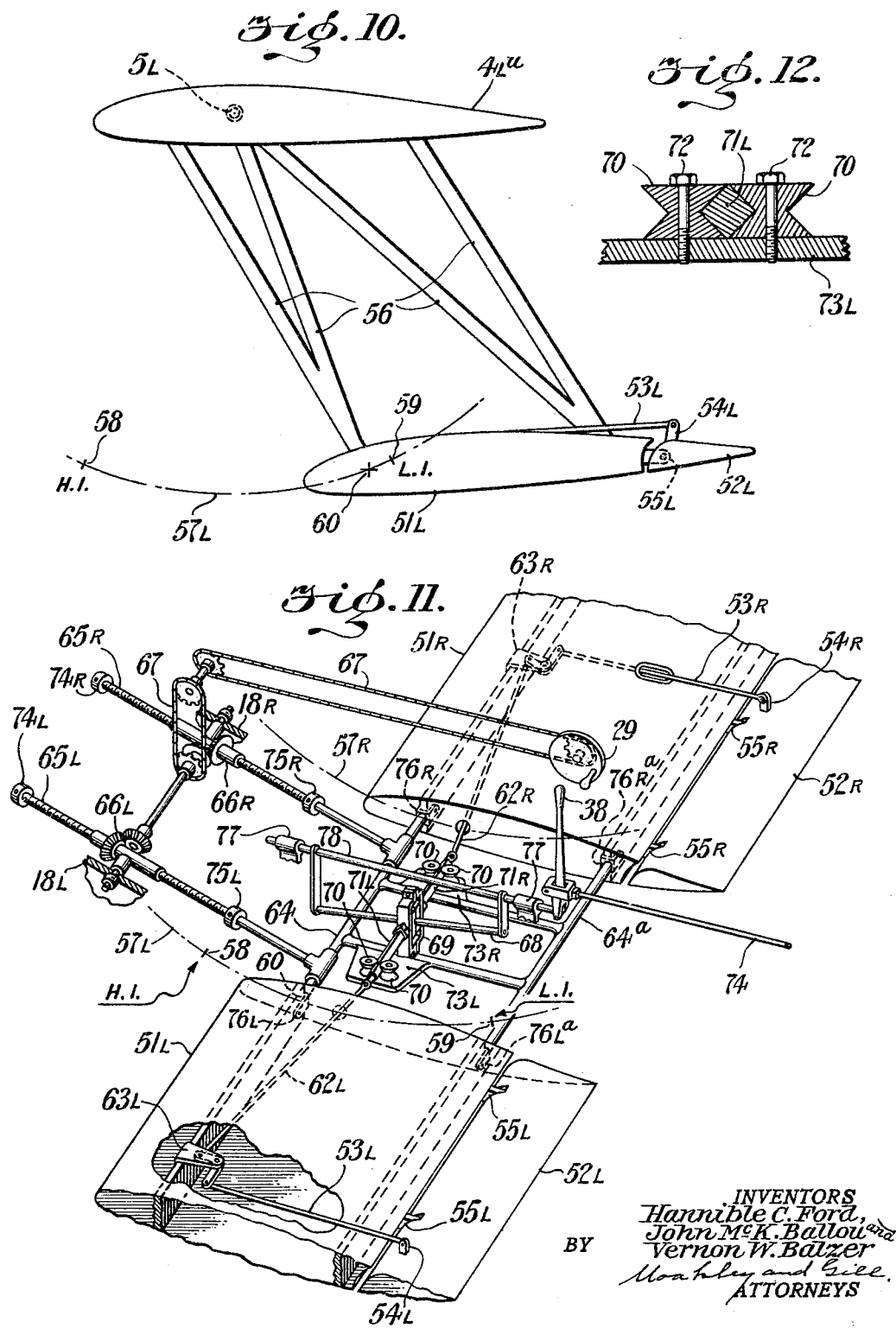

Patented May 3, 1932

1,856,093

UNITED STATES PATENT OFFICE

HANNIBAL C. FORD, OF JAMAICA, AND JOHN McK. BALLOU AND VERNON W. BALZER, OF FOREST HILLS, NEW YORK, ASSIGNORS TO MERRILL AIRCRAFT COMPANY, OF DOVER, DELAWARE, A CORPORATION OF DELAWARE

AIRPLANE

Application filed March 17, 1931. Serial No. 523,226.

This invention relates to airplanes in general and in particular to airplanes wherein the longitudinal control is secured by movements of the wing relative to the fuselage.

We are aware that others have made airplanes in which longitudinal control is secured by angular adjustments of the wings on the fuselage, and that others have made airplanes wherein lateral control was secured by individual hand adjusted movements of right and left wing units. Lateral control by the use of ailerons is well known to those skilled in the art. However, each of these previously used elements, while being useful per se, has certain limitations which the present invention overcomes. Lateral self-equilibration has been accomplished by others in various manners, more or less successfully.

On the current, well known lateral control systems for airplanes, a certain movement of the stick or its equivalent causes a certain angular deflection of ailerons, on the right and left wing structures, resulting in a difference in their lifts. This angular deflection is independent of the speed of the airplane, with the undesirable result that if lateral control is adequate when flying at the minimum speed, as in landing, it is excessive at high speed, because the differential lift varies as the square of the air speed, whereas the lateral moment of inertia of the airplane remains constant. This is particularly disadvantageous, because when the airplane is in its high speed or low angle condition, the necessity for quick lateral angular movements is rather remote, while in the low speed or high angle condition, especially when in the act of landing, successful operation of the airplane is largely dependent on the pilot's ability to cause quick lateral angular movements to overcome the effect of side gusts, rough ground, etc.

An object of this invention is to provide an airplane, wherein longitudinal control is secured by a synchronous variation in angle of attack of the right and left wing units, with a lateral control means wherein the rolling moment is produced by a difference between the angle of attack of one of said wing units and the other.

Another object of this invention is to correlate the amount of roll control with the adjusted position of the longitudinal control. Another object is to proportion the elements of the lateral control means and to interconnect the right and left sections thereof so as to make the airplane self-equilibrating laterally, while also providing an optional means for manually controlling the airplane in roll.

It is evident then, that the following qualities, possessed by an airplane embodying this invention, are highly desirable. In the first place, a simple system for control, in which certain of the same elements are used for both longitudinal and lateral control, in the second place, a means resident in the lateral control elements that provides lateral self-equilibration, and in the third place a coordination between speed and lateral control, which affords either equal rolling moments, regardless of speed, or reduced rolling moments at high speed, as desired for any particular design.

Other objects will appear from the ensuing description of the drawings wherein:

Fig. 1 is a side elevation of an airplane embodying the present invention, with the wings set differentially, Fig. 2 is a schematic perspective view showing a pair of wings adjusted alternatively to the position of the wings of Fig. 1.

Fig. 3 is a diagrammatic transverse vertical view of a mechanism suited to the operation of a monoplane embodying the present invention, shown partly in section with the mechanism set in its neutral position, Fig. 4 is a fragmentary sectional detail of one of the bevel gear units of Fig. 3, Fig. 5 is a view of the right wing of Fig. 2, Fig. 6 is a fragmentary detail of the mounting of one of the bell cranks in its supporting post, Fig. 7 is a fragmentary detail of the square end of the screw post passing through the cross truss, Fig. 8 is a fragmentary detail on line 8—8 of Fig. 3, showing the joint between the bell crank and the wing, Fig. 9 is a balance diagram for a wing system adapted to the exercise of an alternative construction embodying the present invention, Fig. 10 is a biplane cellule adapted to the present invention, Fig. 11 is a diagrammatic view of a mechanism suited to an alternative construction embodying the present invention where a biplane is used, and Fig. 12 is a sectional detail of cross rod and one pair of the roller guides therefor of the form shown in Fig. 11.

The sub-numbers represent corresponding parts in each figure, and throughout L and R following a number designates left and right respectively.

In Fig. 1, an airplane consists of fuselage 1 upon which is mounted a propeller 2 driven by suitable means, and a group of tail surfaces 3, which may include a stabilizer 3a or not according to the characteristics of the profile of wings 4L, 4R.

If it were desired to construct an airplane embodying this invention without any stabilizer, or to construct an airplane with a stabilizer adjusted to carry neither an upward nor a downward load, then the wing profile to be selected is one of the class wherein the lines of action of the resultant forces progress consecutively from front to rear within the region containing the center of gravity of the airplane as the angle of attack is increased throughout the flying range, as is fully disclosed in the co-pending application dated September 6, 1929, filed by Albert A. Merrill, and bearing Serial Number 390,767.

The wings 4L and 4R are mounted by a suitable suspension 5L and 5R about which they are adapted to rotate to assume various adjusted angles of attack. The left wing 4L is shown in solid outline, while the right wing 4R is shown in broken outline. The right wing 4R is shown as being set at a greater angle of attack than the left wing 4L.

Points 6L and 6R, in the rearward portion of the wings 4L, 4R, are suitable for a secondary suspension means not shown in Fig. 1 adapted to move the right and left wings either synchronously or differentially or both synchronously and differentially at the same instant, in such a manner as to adjust their angles of attack.

In Fig. 2, the wings from the airplane of Fig. 1 are shown detached, but their relative locations maintained except that they are in an alternative position from that shown in Fig. 1, the right wing 4R being set with a lower angle of attack than the left wing 4L. The wings 4L and 4R are supported with cylindrical shafts 5L and 5R, hung in inner terminal bearings 7L and 7R and bearings 8L and 8R supported by struts 9L and 9R. Points 6L and 6R are adapted to receive an adjusting mechanism, an example of which is shown in Fig. 3.

Fig. 3 shows an adjusting mechanism for the wings 4L, 4R, of the airplane of Fig. 1, set in its neutral position. That is, the right and left wings, 4L, 4R, both have the same angle of attack, which constitutes a third alternative position of adjustment. The points on the wings 6L and 6R are sustained by bell cranks 10L and 10R, articulated on pins 20L and 20R driven in screw posts 21L and 21R, shown more clearly in Fig. 6. The upper extremities of the screw posts, 17L and 17R, shown also in Fig. 7, are of square or other non-rotatable cross section, restrained by corresponding holes 16L and 16R in the cross structure 15. It should be noted here that the screw posts 21L and 21R are of right and left hand lead respectively. The cross structure 15 is secured to the main fuselage structure 18L and 18R by bolts 19L and 19R or other suitable means. Referring to Fig. 3, and also to Fig. 4 which shows a sectional view of the left hand group of Fig. 3, the screw 21L is adjustably raised and lowered by the rotation of the nut and bevel gear unit 25L. Ball bearings 48L support the unit 25L, in combination with the thrust nose piece 22L, screwed onto the unit 25L and set screwed with the screw 47L. A cross-beam 23L drilled to receive the unit 25L is formed to provide raceways for the ball bearings 48L and thereby to support the thrust of the screw post 21L, and is secured to the main frame 18L of the fuselage 1 in a suitable manner, as by the bolts 24L and 24R. Bevel gears 26L and 26R mesh with the bevel gears of units 25L and 25R, and are rigidly secured to cross shaft 28, which is rotatable by means of the hand wheel 29, or other suitable means. Thus, rotation of hand wheel 29 by the pilot in one direction will raise the screw posts 21L and 21R and vice versa. The lead of the screw posts 21L and 21R is such that they are irreversible, or otherwise expressed, they may be moved by operation of the hand wheel, but the hand wheel may not be rotated by exerting axial forces on the screw posts 21L and 21R. This provides a means for synchronously adjusting the angle of attack, as raising the screw posts 21L and 21R will raise the trailing edges of the wings 4L and 4R while they are pivoted in bearing 7L, 7R, 8L, 8R, by equal amounts and vice versa, and in any adjusted position the screws 21L and 21R will remain until moved by further operation of the hand wheel 29.

The lower, inner ends of bell cranks 10L and 10R are swingably connected to the two ends of cross link 11, provided at a suitable location with a ball joint 12, slidable upon rod 13 which is swingably pinned at 14 to the cross truss 15 or to some other suitable fixed point in the fuselage 1. The other end of rod 13 is adjustably swung by link 30, operated by bell cranks 32 and links 31 and 34.

Link 34, provided with a swivel or other suitable device 35 is operated by lateral movements of joy stick 38. A lug 37 is provided for operation, through a suitable mechanism, of the elevator, by any well known method and does not form a part of this invention. A base 36 carries a rotatable member 39 upon which the joy stick 38 is swingable in a fore and aft direction. The swivel 35 permits cross swinging of the joy stick 38 while in any fore and aft position of inclination. Base 36, and bell crank brackets 33 are secured to any suitable member in the fuselage structure. Upward movements of the screw posts 21L and 21R reduce the radius of rod 13 and vice versa, thus when the wings are adjusted by hand wheel 29 for high angle of attack, the radius of rod 13 is a maximum, and a certain lateral angular movement of joy stick 38 produces a maximum corresponding difference in angle of attack between the right wing 4R and the left wing 4L while in the low angle adjusted position, a minimum corresponding difference is accomplished.

In Fig. 5, the root of the right wing 4R is shown in such a manner that the connections may be more clearly explained, particularly with the aid of Fig. 8. At 5R, a shaft, which may serve also as the front spar sustains the principal lift of the wing and permits of its free rotation in a plane parallel to the surface of the drawings. At 46 is shown a line passing through the center of the shaft 5R and also through the medial point of wing 4R at point 6R. This point may properly be the terminal of a rear spar or other structural member not herein described. A bracket, 42, 42, is formed as an integral part of wing 4R. A suitable device, such as a bolt 41 and nut 44 clamping a sleeve 45 between the two elements 42, 42 of the wing structure, and with its axis lying along line 46, supports the terminal 43 of bell crank 10R. This terminal 43 has a curved bore, and it does not fill the space between the lugs 42, 42, which permits of complete support of the rear portion of the wing 4R, both in the direction of its span, and vertically, but at the same time accommodates its movement in a circular arc, while the screw post 21R moves in a straight line.

Further reference to Fig. 5, and to Fig. 9 shows how, if a laterally self-equilibrating airplane be desired, the hereinbefore described construction may accomplish it. The front pivotal support 5R is placed a suitable distance forward of point 40, the intersection of center line 46 and the line of action of the resultant aerodynamic force acting on the wing 4R. Referring to the diagram of Fig. 9 it is seen that the weight of the airplane W, acting downward at 5R, supported by the lift P, applied at point 40, induces a rotating moment 49R, tending to decrease the angle of attack of the wing 4R. If this moment is equal to the moment 49L (not shown) acting on the left wing 4L (see Figures 2 and 3) then the system will be in equilibrium because equal and opposite forces will be induced on the cross link 11, through the bell cranks 10L and 10R. However, if a gust should act on say the right wing 4R, but not on the left wing 4L, then the moment 49R would be in excess of the corresponding moment 49L, and the unbalanced force resulting therefrom on cross link 11 would induce it to move toward the right (assuming the stick 38 to be free from the pilot's hand) and the right wing 4R would rotate to decrease its angle of attack while the left wing 4L would rotate to increase its angle of attack. Thus, the wing which had received an upwardly upsetting force, would thereby move in such a manner to decrease its unit lift, while the wing which had received no upwardly upsetting force would correspondingly have its unit lift increased by a corresponding amount. The result would be that gusts or other upsetting influences, tending to roll the airplane, would of themselves induce changes which would compensate for them, while in the absence of disturbing influences, the natural balance of the elements of the airplane would tend to avoid departure from its normal lateral attitude.

In Fig. 10 is shown a biplane cellule consisting of an upper wing $4L^u$, and a lower wing 51L interconnected by a suitable rigid system of external trussing 56. At a suitable point in the upper wing $4L^u$, a pivot 5L is provided to sustain the weight of the fuselage and contents (not shown) while permitting rotational movements of the cellule. A point 60 on the lower wing, suitable to the placing of a structure shown in more detail in Fig. 11, is adapted to traverse the arc 57L between the point 58L corresponding to the maximum desired high angle of attack H. I., and the point 59L, corresponding to the minimum desired low angle of attack, L. I. An aileron 52L is provided on the lower wing 51L hinged to a suitable system of brackets 55L and is actuated through horn 54L by push-pull rod 53L.

In Fig. 11, the lower wing system of the cellule of Fig. 10 is shown detached for clearness of description. It consists of left lower wing 51L, cross connected to right lower wing 51R by truss 64, 64a, the front extremities of which are secured to the structures of wings 51L and 51R by clamps 76L and 76R, and are swingable along arcs 57L and 57R in the manner described above referring to Fig. 10. The rear extremities of truss 64, 64a, are secured to other suitable portions of the wing structure by clamps $76L^a$, $76R^a$. Adjustable constraint is afforded to cross truss 64, 64a, by articulating the front member, 64, in the bearings of screw connecting rods 65L, 65R, provided with limit stops 74L, 74R, and 75L, 75R. These screws are adjusted through the medium of the bevel gear and support system 66L, 66R, the details of which are not fully shown, but which may be constructed similar to those shown in Fig. 4. Here, instead of using right and left lead screws as hereinbefore described, the disposition of bevel gears 66L is shown reversed from that of bevel gears 66R, while both screws have right hand lead to accomplish the same result as that described under Figs. 3 and 4. The bevel gear system 66L, 66R is here shown as driven through the chain and sprocket train 67 by the hand wheel 29 located to suit the convenience of the pilot.

A joy stick 38, when swung in a lateral direction turns rock shaft 78, hung in bearings 77, suitably mounted in the fuselage, and thereby causes the axis of rod 68 to describe a portion of the surface of a truncated cone, as will be clearly understood from the drawings. A Scottish yoke 69, equipped with a ball and socket joint similar to the ball and socket joint 12 of Fig. 3 is slidable on rod 68, and is rigidly secured to the left and right hand sections 71L and 71R that constitute a cross rod, which is rigidly combined with the Scottish yoke. The cross rod sections 71L and 71R may be of square cross section as shown in Fig. 12, and guided by rollers 70 rolling about bolts 72 secured to framing 73L, and 73R, integral with cross truss 64, 64a. Thus the location of Scottish yoke 69 on rod 68, and consequently the radius of throw of rod 68, considered as a crank is determined by the location of cross truss member 64 in arcs 57L, 57R. As will be evident from Fig. 11, when the wings are adjusted to the high-angle of attack setting, H. I., Scottish yoke 69 will be subjected to movements by a crank of maximum throw, while with the wings adjusted to their low angle of attack setting, L. I., the corresponding crank will have minimum throw. The square section of cross rod 71L, 71R, constrains it against rotations, and prevents cocking of Scottish yoke 69 into an operative position, while allowing free axial movements through the rollers 70. Motion imparted to cross-rod 71L, 71R, is transmitted to push-pull rods 62L, 62R, through bell cranks 63L, 63R to push-pull rods 53L, 53R, and through horns 54L, 54R, into the proper and well known movements of ailerons 52L and 52R. Motion for operation of the elevators, if desired, is taken from the joy stick 38, through push-pull rod 74, and by means of any suitable, well known linkage to the conventional elevator horns. It is manifest then, that in the above described system, when the airplane is in its low angle, or high speed condition, any lateral angular movement of the control stick 38 will induce an angular displacement of the ailerons of less magnitude than will an equal movement of the stick 38 when the airplane is in its high angle, or low speed condition.

If a laterally self-equilibrating airplane with a separate and distinct system of lateral control in addition were desired, it will be readily seen that if ball joint 12 of Fig. 3 were removed from cross link 11, and instead, a mechanism similar to that comprising elements 69, 70, 71L, 71R, 62L, 62R, 63L, 63R, 53L, 53R, 54L, 54R, 55L, 55R, and 52L, 42R, were added, with rod 13 operating Scottish yoke 69, it could be constructed without difficulty by anyone skilled in the art. This would constitute a system wherein lateral self-equilibration and angle of attack control would be secured as described under Figs. 1 to 9 inclusive with the pilot's hand not on the stick 38, and would afford lateral hand control as described under Figs. 10, 11, 12, by ailerons 52L, 52R, and entirely independent of the differential angular movements of the wings 4L, 4R, the pilot's hand movements of the stick 38 operating the ailerons 52L, 52R, independently of the self-equilibration feature supplied by the linkage of Fig. 3.

While certain preferred embodiments of the invention have been disclosed it will be understood that it may be embodied in other forms and that various changes in structural details may be made without departing from the principle of the invention as defined in the appended claims.

We claim:

1. An airplane comprising a fuselage, right and left wing structures rotatable on said fuselage to vary their angles of attack, and a control system including a mechanism for synchronously adjusting the rotated positions of said wings, a linkage train for differentially adjusting the rotated positions of said wings and a variable ratio device in said train whose ratio is adjusted by the adjustment of said mechanism.

2. In an airplane having lateral control surfaces and whose longitudinal control is secured by adjusting the angular relation between the wing structure and the fuselage, a variable ratio device connected to the wing operating mechanism to co-ordinate the degree of angular deflection of the lateral control surfaces with the position of adjustment of said wing structure.

3. An airplane comprising a fuselage, right and left wing structures of the class wherein the lines of action of the resultant aerodynamic forces progress consecutively from front to rear in a region containing the center of gravity of the airplane as the angle of attack is increased throughout the flying range, said wing structures being rotatable on said fuselage, and a control system including means for synchronously adjusting the rotated positions of said wings, and means for differentially adjusting the rotated positions of said wings.

4. In an airplane of the adjustable wing class, a laterally self-equilibrating system comprising right and left wing structures of the class wherein the lines of action of the resultant aerodynamic forces progress consecutively from front to rear within the locus of the center of gravity of the airplane throughout the flying range, as the angle of attack is increased, and a pivotal support for said wing structures, the axis of said support being forward of said lines of action in combination with interconnected rear supports for said wing structures balanced one against the other.

5. An airplane comprising a fuselage, right and left wing structures rockable on said fuselage to vary their angles of attack, and a control system including a mechanism for adjusting the rotated positions of said wings in unison in the same direction, a train for differentially adjusting the rotated positions of said wings, and a variable ratio device in said train whose ratio is adjusted by the adjustment of said mechanism to determine the angular deflection of said wings for equal control movements.

6. In an airplane wherein longitudinal control is secured by varying the angular relation between the wing structure and the fuselage, and wherein lateral control is secured by differential angular displacements of right and left aerodynamic surfaces, a control system comprising a mechanism for varying said angular relation, and a gear for displacing said surfaces in opposite directions including a ratio device having a high ratio when said mechanism is adjusted for a large angle to said fuselage and a low ratio when said mechanism is adjusted for a small angle to said fuselage.

7. In an airplane wherein longitudinal control is secured by varying the angular relation between the wing structure and the fuselage, and wherein lateral control is secured by differential angular displacements of right and left aerodynamic surfaces, a control system comprising a mechanism for varying said angular relation, and a gear for displacing said surfaces in opposite directions, said gear including a device for increasingly restricting the extent of said displacements as said angular relation approaches its minimum values.

8. In an airplane control system comprising a longitudinal control means for varying the angle of attack of the airplane and a lateral control means for displacing right and left aerodynamic surfaces in opposite directions, a variable ratio device included in said lateral control means operated by said longitudinal control means whose ratio increasingly restricts the extent of movement of said surfaces as the angle of attack is decreased.

In testimony whereof, we have affixed our signatures.

HANNIBAL C. FORD.
JOHN McK. BALLOU.
VERNON W. BALZER.